Patented May 17, 1949

2,470,479

UNITED STATES PATENT OFFICE 2,470,479

PROCESS FOR MAKING POLYSILOXANE RESINS

Charles S. Ferguson, Troy, and Charles E. Welsh, Schenectady, N. Y., assignors to General Electric Company, a corporation of New York No Drawing. Application November 21, 1945, Serial No. 630,136

9 Claims. (Cl. 260—46.5)

The present invention relates to novel polysiloxane resins and to a method of preparing such resins. It is particularly concerned with improved processes of hydrolyzing trichlorosilanes and dichlorosilanes to obtain improved polysiloxane resinous products having a hydrocarbon-to-silicon ratio greater than 1 and less than 2.

It is well known that organohalogenosilanes, or mixtures thereof which may also contain some silicon tetrahalides, readily hydrolyze when mixed with water to form silanols which condense or can be caused to condense to form polysiloxanes. The ease with which the silanols condense is dependent on the nature of the organic radical or radicals. When all or substantially all of these radicals are methyl groups the rate of dehydration or condensation is so rapid that for all practical purposes the condensation of the silanols occurs simultaneously with the hydrolysis of the chlorosilanes. Because both reactions occur instantaneously, the hydrolysis of methylchlorosilanes containing a sufficient number of chlorine atoms attached to silicon to form heat-hardenable products by mixing them with water results in the formation of insoluble gels which cannot be used in the manufacture of useful resinous compositions or in the formation of products of low average molecular weight rather than the high average molecular weight products sought in the preparation of resinous products in general.

Various methods have been devised for controlling the hydrolysis reaction and the earlier attempts along this line had for their principal object the prevention of gel formation during hydrolysis. However, as more and more knowledge accumulated concerning the various methods of hydrolysis, it became apparent that certain methods not only permitted the carrying out of the hydrolysis without using ice or ice-water mixtures for the more readily hydrolyzable chlorosilanes but also resulted in the formation of polysiloxanes having properties markedly different than those of the earlier known polysiloxanes which had the same general formula and were prepared from the same chlorosilane mixtures. It thus appears that the polysiloxanes, particularly those obtained by the co-hydrolysis and co-condensation of mixtures of two or more chlorosilanes, will differ from one another, depending on the conditions of hydrolysis and condensation, in much the same way that other resinous materials, such as the phenol-formaldehyde condensation products, differ from one another depending upon the conditions under which the resin forming reactions are caused to take place.

One of the earlier methods for controlling the hydrolysis of methylchlorosilanes is described in Rochow Patent 2,258,218 and comprises dissolving the chlorosilane mixture in ether and adding the resultant solution to ice or a mixture of ice and water. Another process is described and claimed in the copending application Serial No. 455,617, filed August 21, 1942, now Patent Number 2,398,672, in the name of Robert O. Sauer and assigned to the same assignee as the present invention. The Sauer process comprises the solution of the chlorosilanes in a solvent such as toluene and the addition of this solution to a mixture comprising water and a higher alcohol such as butanol. Although the prior methods resulted in the formation of liquid, heat-hardenable products, they also involve certain disadvantages. Large volumes of solvents were usually necessary and in some cases the resinous products possessed poor craze resistance. Certain of the methods did not lend themselves either to the easy separation of the solvents or the recovery of the hydrogen chloride by-product, both of which are essential in any large scale commercial project.

The present invention is based on the discovery that improved polysiloxane resins particularly characterized by the fact that cured films thereof are tougher than previously known polysiloxane resins of the same chemical composition, can be obtained by a process which comprises partially hydrolyzing methyltrichlorosilane or a mixture thereof with phenyltrichlorosilane, adding a dichlorosilane to the partially hydrolyzed trichlorosilane and thereafter completing the hydrolysis of the mixture to obtain a polysiloxane resin. Preferably a co-solvent for the chlorosilanes and water is present during the hydrolysis in order to prevent gelation of the condensation products. Water soluble ethers such as diethyl Carbitol (ethylene glycol diethyl ether) and diethyl Cellosolve [bis(beta-ethoxyethyl) ether] or mixtures thereof have been found to be particularly useful for this purpose. Solvents such as alcohols, which react with chlorosilanes, are to be avoided.

It is also desirable to have present in the hydrolysis medium, at least during the latter part of the hydrolysis process, an inert solvent for the purpose of preventing gelation of the entire batch during the time the last 10 or 15 per cent of the water is being added. However, such a solvent is not essential to the carrying out of the present invention as other means of preventing possible gelation at this point in the process can be employed. Such alternative means comprise heating the hydrolysis medium to remove excess hydrogen chloride or the use of a mixture of silanes containing a substantial proportion (25% or more) of phenylchlorosilanes. Alternatively the hydrolysis can be stopped at 90 to 95% conversion and the resin solution poured into a large excess of water.

In order that those skilled in the art better may understand how the present invention can be carried into effect the following illustrative examples are given:

EXAMPLE 1

The equipment employed consisted of a 1 liter, 3-necked flask provided with a stirrer, a dropping funnel, and a condenser provided with means for removing and recovering hydrogen chloride. A solution of 100 g. methyltrichlorosilane, 50 g. phenyltrichlorosilane and 100 g. diethyl Carbitol was placed in the flask and the stirrer started. A second solution of 16.1 g. water and 100 g. diethyl Carbitol was added from the dropping funnel over a period of 20 minutes. The solution was stirred for 5 minutes and 50 g. dimethyldichlorosilane was poured into the flask. Sufficient water was added from the dropping funnel to carry the hydrolysis to 95% completion. This required an additional 13.5 g. of water which was added over a period of 15 minutes. The resin solution was diluted immediately with 100 g. xylol and washed with three 500 cc. portions of cold water. After washing, the resin solution was filtered and concentrated to about 50% base. The resulting resin, after baking overnight at 150 degrees C. was hard and tough. In general, the resins prepared in this manner have been tougher than polysiloxane resins of the same composition prepared by the previously known hydrolysis techniques.

EXAMPLE 2

The equipment employed in this example comprised a 3-necked flask, provided with a stirrer, a dropping funnel, and a tube leading to a condenser packed with glass wool and provided with means for conducting hydrogen chloride glass to a hydrogen chloride recovery system and means for collecting condensate. For best results the glass wool packing in the condenser is saturated diethyl Cellosolve at the beginning of each run, and additional diethyl Cellosolve was dropped slowly on the packing throughout each run to permit the collection of gel-free hydrogen chloride.

A mixture of 50 g. diethyl Carbitol, 50 g. methyltrichlorosilane, and 25 g. phenyltrichlorosilane was introduced into the flask and a mixture of 50 g. diethyl Carbitol and 8.1 g. water was slowly added thereto through the dropping funnel, the total time required for this addition being about 5 minutes. 25 g. dimethyldichlorosilane was added to the partial hydrolysis mass, followed by the slow addition of 6.8 g. water over a period of 6 minutes. At this point the hydrolysis of the total chlorosilanes had been carried to somewhat over 90% conversion. The resultant product was diluted with 50 g. of 30 degree xylol followed by the addition of 150 g. water which was an amount of water considerably in excess of that necessary to complete the hydrolysis of the chlorosilanes. During this entire process the temperature of the hydrolysis medium was at or above room temperature, resulting in the removal of most of the hydrogen chloride by-product and some low boiling polysiloxanes and solvent. The hydrogen chloride gas was freed of these lower boiling liquid materials in the condenser. The condensate collected therein was added to the contents of the flask, in order to recover any resinous products contained therein. The excess water which collected as a separate layer was removed from the remaining xylol-polyether solution of the polysiloxane resin, and this solution was again washed with 150 g. water to remove any residual hydrogen chloride. The washed resin solution was then heated to 150 degrees C. to remove the final traces of water. The resultant resinous product had a cure time of 20 to 30 seconds and formed hard, tough, non-brittle films when baked at 150 degrees C. for 16 hours.

In the above example the trichlorides were 2/3 hydrolyzed before the addition of the dichloride and the total water added before addition of the xylol was 95% of that theoretically necessary to convert the chlorosilanes to polysiloxanes. Preferably the trichlorosilane is 1/3 to 2/3 hydrolyzed before the addition of the dichlorosilane. Within this preferred range, results have been consistent, and light-colored, smooth, non-brittle, tough, resinous products have been obtained. On the other hand, when the trichlorosilanes were less than 25% hydrolyzed, or were more than 75% hydrolyzed, i. e., when the amount of water added to the trichlorosilane was not more than 25% or less than 75% of that calculated as necessary for complete hydrolysis of the trichlorosilane, baked films of the resinous products were wrinkled, somewhat brittle, and in some cases possessed poor craze resistance. Stated alternatively, it will be obvious to those skilled in the art, that to obtain from 25 to 75 per cent hydrolysis of the trichlorosilanes, or from 1/3 to 2/3 hydrolysis as is preferred, it is necessary to use, for each mol of trichlorosilane in the mixture of trichlorosilanes, from 0.375 to 1.125, preferably from 0.5 to 1.0 mols water.

The nature of the inert solvent appears to have a direct effect on the quality of the final resin. Benzol, petroleum spirits, ethylene dichloride and n-butyl chloride can be satisfactorily substituted for the xylol employed in the above example. However, coal tar naphtha, cyclohexane and the like, cannot be used, films of the resins prepared in the presence of these solvents being consistently darker, wrinkled and of low temperature resistance.

In general the inert solvent such as xylol should be used in an amount from 20% to 40% by weight of the chlorosilanes.

Within the limits, the earlier the point of addition of the inert solvent to the hydrolysis products the smoother the process from the standpoint of freedom from gelation and quality of the final film. However, it has been found that the solvents cannot be added before the total chlorosilanes are at least half hydrolyzed without obtaining resinous products which tend to darken easily, wrinkle badly and craze easily.

Due to the limited solubility of water in diethyl Cellosolve, diethyl Carbitol preferably forms at least part of the polyether composition of the hydrolysis medium and for best results some of this polyether or diethyl Cellosolve should also be mixed with the water employed in partially hydrolyzing the trichlorosilanes. The effect of the type and amount of polyether on the properties of the final resin are shown in Table I, setting forth the results of a series of experiments in which the type and amount of polyether were varied as shown in the table in which "part B" refers to the hydrolyzer charge, "part C" to the water-polyether mixture added to part B, while "a" indicates diethyl Carbitol and "b" indicates diethyl Cellosolve. In each case a mixture of 50 g. methyltrichlorosilane and 25 g. phenyltrichlorosilane was partially hydrolyzed by the addition of a mixture of the designated quantity of polyether and 5.4 g. water, the time of addition being four minutes. Fifty grams xylol was then added followed by the addition of 25 g. dimethyldichlorosilane. To the resultant mixture was added 9.5 g. water over a period of 12 minutes to complete the hydrolysis of all of the chlorosilanes.

Table I

| Exp. No. | Per Cent Ether (on chlorosilanes) | | Part C, a | Resin Film Properties |
|---|---|---|---|---|
| | Part B | | | |
| | a | b | | |
| 1 | 50 | ---- | 40 | Smooth, light color, tough, hard. |
| 2 | 40 | ---- | 50 | Slight wrinkle, light color, tough, hard. |
| 3 | 60 | ---- | 30 | Rough, dark, brittle, crazed. |
| 4 | 30 | ---- | 60 | Do. |
| 5 | 40 | ---- | 40 | Smooth, light, tough, hard. |
| 6 | 50 | ---- | 30 | Rough, dark, brittle, crazed. |
| 7 | 30 | ---- | 50 | Do. |
| 8 | ---- | 60 | 40 | Smooth, light, tough, hard. |
| 9 | ---- | 50 | 40 | Slight wrinkle, light, tough, hard. |
| 10 | ---- | 40 | 40 | Considerable wrinkle, light, tough, hard. |
| 11 | ---- | 70 | 30 | Slight wrinkle, light, tough, hard. |
| 12 | ---- | 60 | 30 | Considerable wrinkle, light, tough, hard. |
| 13 | ---- | 50 | 30 | Considerable wrinkle, darker, more brittle, crazed. |

It will be noted that whenever as little as 30% polyether (on basis of chlorosilanes) is employed in either part B or part C together with less than 60% polyether in the other part, the resinous product is not wholly satisfactory. In general the total quantity of polyether should equal or exceed 80% in order that the results be consistently good. In many cases, a composition of diethyl Carbitol and diethyl Cellosolve appears to be preferred to either alone, particularly when all or part of the polyether component of part C is diethyl Carbitol.

From the above it will be apparent that best results are obtained from the two stage hydrolysis process of the present invention when the trichlorides are from one-half to two-thirds hydrolyzed before addition of the dichlorosilanes, the water immiscible solvent is employed in an amount equal to at least 20% by weight of the chlorosilanes and the total polyether content of both the trichlorosilane mixture and the water-ether composition employed in partial hydrolyzing the trichlorosilanes is at least 30% by weight based on the chlorosilanes.

What we claim as new and desire to secure by Letters Patent of the United States, is:

1. The method of making a polysiloxane resin which comprises forming a solution of a mixture of methyltrichlorosilane and phenyltrichlorosilane in polyether solvent comprising bis (beta-ethoxyethyl) ether, adding to said solution an amount of water which is more than 25% and less than 75% of that calculated as necessary for complete hydrolysis of said chlorosilanes, the said water of hydrolysis being present in an amount equal to from 0.375 to 1.125 mols water per mol trichlorosilane, adding dimethyldichlorosilane to the partially hydrolyzed mixture of trichlorosilanes, and adding sufficient water to the resultant product to convert al of the chlorosilanes to polysiloxanes.

2. The method of making a polysiloxane resin which comprises forming a solution of methyltrichlorosilane in a polyether solvent selected from the group consisting of bis (beta-ethoxyethyl) ether, ethylene glycol diethyl ether and mixtures thereof, partially hydrolyzing said trichlorosilane by adding to said solution an amount of water which is from ⅓ to ⅔ that calculated as necessary for complete hydrolysis of said trichlorosilane, the said water of hydrolysis being present in an amount equal to from 0.5 to 1 mol water per mol trichlorosilane, adding dimethyldichlorosilane to the partially hydrolyzed trichlorosilane, slowly adding additional water to the resultant mixture until the total amount of water is from 90 to 95% of that calculated to convert all of said chlorosilanes to polysiloxanes, mixing the resultant solution with a water immiscible hydrocarbon solvent and thereafter adding an excess of water to the hydrocarbon solvent containing mixture.

3. The method of making a polysiloxane resin which comprises forming a solution of a mixture of methyltrichlorosilane and phenyltrichlorosilane in a polyether solvent comprising bis (beta-ethoxyethyl) ether, adding to said solution an amount of water which is from ⅓ to ⅔ that calculated as necessary for complete hydrolysis of said chlorosilane, the said water of hydrolysis being present in an amount equal to from 0.5 to 1.0 mol water per mol trichlorosilane. adding dimethyl dichlorosilane to the partially hydrolyzed mixture of trichlorosilanes, and thereafter completing the hydrolysis of all of the cholorosilanes.

4. The method of making a polysiloxane resin which comprises dissolving 50 parts methyltrichlorosilane and 25 parts triphenylchlorosilane in 50 parts ethylene glycol diethyl ether, adding to the resultant solution a mixture of 8 parts water and 50 parts ethylene glycol diethyl ether to partially hydrolyze said trichlorosilanes, adding 25 parts dimethyldichlorosilane to the partially hydrolyzed trichlorosilanes, slowly adding water to the resultant solution until the total quantity of water is from 90 to 95% of that calculated as necessary for a complete hydrolysis of chlorosilanes, mixing this partially hydrolyzed mass with 50 parts of a water immiscible hydrocarbon solvent and thereafter adding to the hydrocarbon solvent-containing mixture a quantity of water considerably in excess of that necessary for a complete hydrolysis of said chlorosilanes.

5. The process of claim 4 wherein the hydrocarbon solvent is xylol.

6. The method of making a polysiloxane resin which comprises forming a solution of methyltrichlorosilane in a polyether solvent selected from the group consisting of bis (beta-ethoxyethyl) ether, ethylene glycol diethyl ether and mixtures thereof, adding to said solution an amount of water which is more than 25% and less than 75% of that calculated as necessary for complete hydrolysis of said trichlorosilane, the said water of hydrolysis being present in an amount equal to from 0.375 to 1.125 mols water per mol trichlorosilane, adding dimethyldichlorosilane to the partially hydrolyzed trichlorosilane and thereafter adding sufficient water to the resultant product to convert all of the chlorosilanes to polysiloxanes.

7. The method of making a polysiloxane resin which comprises forming a solution of metyltrichlorosilane in a polyether solvent selected from the group consisting of bis (beta-ethoxyethyl) ether, ethylene glycol diethyl ether and mixtures thereof, adding to said solution a mixture of one of said polyethers and water in an amount which is more than 25% and less than 75% of that calculated as necessary for complete hydrolysis of said trichlorosilane, the said water of hydrolysis being present in an amount equal to from 0.375 to 1.125 mols water per mol trichlorosilane, adding dimethyldichlorosilane to the solution of partially hydrolyzed trichlorosilane and thereafter adding sufficient water to completely hydrolyze all of the chlorosilanes.

8. The method of making a polysiloxane resin which comprises forming a solution of methyltrichlorosilane in a polyether solvent selected from the group consisting of bis (beta-ethoxyethyl) ether, ethylene glycol diethyl ether and mixtures thereof, adding to said solution a mixture of one of said polyethers and water in an amount which is from ⅓ to ⅔ that calculated as necessary for complete hydrolysis of said trichlorosilane, the said water of hydrolysis being present in an amount equal to from 0.5 to 1.0 mol water per mol trichlorosilane, adding dimethyldichlorosilane to the solution of partially hydrolyzed trichlorosilane and thereafter adding sufficient water to completely hydrolyze all of the chlorosilanes, the polyether content of the trichlorosilane solution and the polyether-water mixture added thereto being equal to at least 30 percent by weight based on the chlorosilanes.

9. The method of making a polysiloxane resin which comprises forming a solution, by weight, of 50 parts methyltrichlorosilane and 25 parts phenyltrichlorosilane in at least 30 parts of a polyether solvent selected from the group consisting of bis (beta-ethoxyethyl) ether, ethylene glycol diethyl ether and mixtures thereof, adding to said solution a mixture of at least 30 parts of one of said polyethers and water in an amount which is more than 25% and less than 75% of that calculated as necessary for complete hydrolysis of said trichlorosilane, the said water of hydrolysis being present in an amount equal to from 0.375 to 1.125 mols water per mol trichlorosilane, adding 25 parts dimethyldichlorosilane to the solution of partially hydrolyzed trichlorosilanes and thereafter adding sufficient water to completely hydrolyze all of the chlorosilanes, the total quantity of polyethers employed in the process equalling at least 80 percent by weight based on the weight of the chlorosilanes.

CHARLES S. FERGUSON.
CHARLES E. WELSH.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,371,068 | Rochow | Mar. 6, 1945 |
| 2,375,998 | McGregor et al. | May 15, 1945 |
| 2,383,827 | Sprung | Aug. 28, 1945 |
| 2,289,477 | Wright et al. | Nov. 20, 1945 |
| 2,298,672 | Sauer | Apr. 16, 1946 |
| 2,405,041 | Mathes et al. | July 30, 1946 |
| 2,406,621 | Marsden | Aug. 27, 1946 |